(12) United States Patent
Hudson et al.

(10) Patent No.: US 6,324,339 B1
(45) Date of Patent: Nov. 27, 2001

(54) BATTERY PACK INCLUDING INPUT AND OUTPUT WAVEFORM MODIFICATION CAPABILITY

(75) Inventors: Richard A. Hudson, Bell; Bobby L. Tibbs, Gainesville; Daniel L. Killebrew, Lake City, all of FL (US)

(73) Assignee: Eveready Battery Company, Inc., St. Louis, MO (US)

( * ) Notice: Subject to any disclaimer, the term of this patent is extended or adjusted under 35 U.S.C. 154(b) by 0 days.

(21) Appl. No.: 09/450,870

(22) Filed: Nov. 29, 1999

(51) Int. Cl.[7] ............................................. H02P 5/17
(52) U.S. Cl. .................... 388/937; 318/499; 320/135; 388/811
(58) Field of Search ............................ 388/811, 819, 388/937; 318/599, 139; 320/118, 135, 141, 145

(56) References Cited

U.S. PATENT DOCUMENTS

| | | | |
|---|---|---|---|
| 4,818,928 | * 4/1989 | Schosser | 320/2 |
| 4,851,743 | 7/1989 | Schmerda et al. | 388/811 |
| 4,950,968 | 8/1990 | Ogura | 318/599 |
| 5,014,793 | 5/1991 | Germanton et al. | 173/12 |
| 5,017,854 | 5/1991 | Gully et al. | 318/811 |
| 5,089,761 | 2/1992 | Nakazawa | 318/811 |
| 5,193,146 | 3/1993 | Kohno | 388/811 |
| 5,204,608 | * 4/1993 | Koenck | 320/2 |
| 5,268,622 | 12/1993 | Philipp | 318/254 |
| 5,298,871 | 3/1994 | Shimohara | 332/109 |
| 5,376,874 | 12/1994 | Ramme | 320/21 |
| 5,388,176 | 2/1995 | Dykstra et al. | 388/811 |
| 5,525,895 | * 6/1996 | Fishman | 323/268 |
| 5,629,604 | * 5/1997 | Sengupta et al. | 320/31 |
| 5,635,814 | * 6/1997 | Afzal et al. | 320/2 |
| 5,657,417 | 8/1997 | Di Troia | 388/829 |
| 5,675,232 | * 10/1997 | Koenck | 320/2 |
| 5,680,026 | * 10/1997 | Lueschen | 320/2 |
| 5,731,673 | 3/1998 | Gilmore | 318/432 |
| 5,731,686 | 3/1998 | Malhi | 320/35 |
| 5,736,271 | * 4/1998 | Cisar et al. | 429/96 |
| 5,744,920 | 4/1998 | Orton | 318/139 |
| 5,744,930 | * 4/1998 | Fleming et al. | 320/2 |
| 5,767,659 | * 6/1998 | Farley | 320/106 |
| 5,853,915 | * 12/1998 | Suto | 429/99 |
| 5,929,597 | 7/1999 | Pfeifer et al. | 320/107 |
| 5,962,157 | 10/1999 | Kang | 429/62 |
| 6,118,248 | * 9/2000 | Gartstein et al. | 320/107 |

FOREIGN PATENT DOCUMENTS

| | | | | |
|---|---|---|---|---|
| 1234641 | 10/1999 | (CN) | | H02J/7/00 |
| 0847123 | 6/1998 | (EP) | | H02J/7/04 |
| 2308024 | 6/1997 | (GB) | | H02J/7/00 |

* cited by examiner

Primary Examiner—Robert E. Nappi
Assistant Examiner—Rina I. Duda
(74) Attorney, Agent, or Firm—Linda Gebauer; Robert W. Welsh (57) ABSTRACT

A battery pack includes a plurality of electrochemical cells and a control circuit. The battery pack provides power to a tool in the form of a pulse width modulated waveform. The plurality of electrochemical cells provide a total output voltage. The control circuit is coupled to the plurality of electrochemical cells and receives a trigger signal from the tool. In response to the trigger signal, the control circuit determines whether a pulse width of the pulse width modulated waveform requires adjustment. Additionally, the control circuit can be configured to receive an indication of the total output voltage. In this case, the control circuit determines whether the pulse width of the pulse width modulated waveform requires adjustment based on the level of the total output voltage.

27 Claims, 8 Drawing Sheets

BATTERY PACK INCLUDING INPUT AND OUTPUT WAVEFORM MODIFICATION CAPABILITY

BACKGROUND OF THE INVENTION

The present invention generally relates to battery packs and more specifically to a battery pack for supplying power to a tool.

Various electric devices utilize batteries for the supply of operating power. These devices include portable tools which are frequently powered by direct current (DC) sources, such as rechargeable batteries. Such tools include drills and power screw drivers and typically do not require very high voltages. Portable tools that are powered by batteries frequently contain those batteries within the tool's structure. Batteries contained in this manner provide power only to that tool.

Other electric tools have been powered directly from an alternating current (AC) source. For example, many electric yard tools are powered directly from an AC source such as that provided by a standard household electrical outlet. A disadvantage of this type of tool is that it requires a connection (utilizing an electrical cord) to the electrical outlet due to the relatively high power requirements of such tools. As a user carries such a tool around a yard performing various tasks, the electrical cord can become entangled in various things (e.g., trees and/or various shrubbery, etc.) or cut by the tool itself.

To overcome these problems, yard tools have been constructed using gasoline-powered motors. Such gasoline-powered yard tools have been criticized for the air and noise pollution they cause. Battery-powered yard tools have not previously been considered due to the weight of the batteries that would be required to supply the amount of power needed to operate these yard tools.

Many prior art tools have employed a rheostat trigger that controls the voltage level applied by a DC or AC source to a motor of the tool. Some prior art tools have utilized a pulse width modulated waveform to supply power to a motor of the tool. In some of those devices, the width of the pulse width modulated waveform has been varied based upon an output voltage of a battery that supplies power to the device. In other devices, the duty cycle of a pulse width modulated waveform has been varied based upon a trigger signal. Many of these tools have included batteries within the tool's structure or alternatively have been powered by an AC source.

SUMMARY OF THE INVENTION

An embodiment of the present invention is directed to a battery pack for providing power to a tool in the form of a pulse width modulated waveform. The battery pack includes a plurality of electrochemical cells and a control circuit. The plurality of electrochemical cells provides a total output voltage. The control circuit is coupled to the plurality of electrochemical cells and receives a trigger signal from the tool. The control circuit adjusts a pulse width of the pulse width modulated waveform in response to variations in the trigger signal.

Another embodiment of the present invention includes a control circuit that is coupled to the plurality of electrochemical cells and receives an indication of the total output voltage and a trigger signal from the tool. The control circuit adjusts a pulse width of the pulse width modulated waveform in response to variations in the total output voltage and the trigger signal.

These and other features, advantages and objects of the present invention will be further understood and appreciated by those skilled in the art by reference to the following specification, claims and appended drawings.

DETAILED DESCRIPTION OF THE PREFERRED EMBODIMENT

A battery pack according to the present invention includes circuitry that is capable of performing waveform modification on both an input signal received by the battery pack (from a charger) and an output signal provided by the battery pack (to a tool). A control circuit of the battery pack, in a disclosed embodiment, is designed to reduce power consumption (by the control circuit) thereby increasing available power. A given electric motor's performance is dictated by the voltage and current it receives. The voltage, provided to the motor, determines the motor's RPM (revolutions per minute). The current, provided to the motor, determines the motor's torque. The battery pack provides a pulse width modulated (PWM) output voltage that effectively delivers an average voltage ranging between zero and VBAT (the total battery output voltage).

Using the disclosed scheme, a motor's torque is not appreciably affected. This is because the motor is allowed to sink current on demand. The ideal modulation frequency for a PWM output signal is motor dependent and is selected to maximize motor performance. A PWM output signal in the frequency range of 800 Hz to 1 kHz has been found to provide good results for a typical tool motor. An input signal (charging current) from a battery charger can be modified to optimize the charging current for a given battery. This allows a lower cost battery charger to be utilized while still providing a near ideal charging current This also allows the battery to be used with a variety of chargers providing a range of different charging currents. The control circuitry of the present invention can examine the input signal (charging current) provided by a battery charger and then modulate that input signal, as desired.

Output waveform modification is achieved by coupling a tool's trigger rheostat to a reference voltage (VDD) supplied by the battery pack control circuit. In one embodiment, the trigger rheostat provides a VBAT proportional voltage (trigger signal) to a trigger input (TRIG) of the processor. The processor then adjusts a pulse width of the PWM output signal to correspond to a desired motor speed. Alternatively, the processor could utilize a fixed pulse width and vary the frequency at which the fixed width pulses are transmitted to the tool. Utilizing a PWM scheme is preferable to a linear control scheme because a linear control scheme impacts the efficiency of the power delivered to the tool to a greater extent. The battery pack of the present invention allows a tool to maintain a constant RPM even when the voltage of the pack is declining (due to discharge). The battery pack according to the present invention can be beneficially utilized with various electric tools (e.g., a pruner, edger, hedge trimmer, weed whacker, blower, etc.) and/or other electrical devices.

As described below, the battery pack of the present invention is capable of limiting output current and disconnecting the battery pack from a battery charger if the battery voltage is too great or the battery temperature is too high or too low. In addition, the control circuit disconnects the battery pack from a tool if the tool is drawing too much current, the battery temperature is too high or the battery voltage is too low. The battery pack of the present invention allows the tool to be lighter (with the batteries and control circuitry off-loaded into the battery pack). Also, the battery pack eliminates the need for such waveform modification circuitry to be provided in the tool. This additionally lowers the cost of the tool itself. Thus, the battery pack of the present invention can be used on multiple tools with varying power requirements. The battery pack of the present invention is typically connected, through releasable connectors, to a tool such that it is easily changed from one tool to another.

Figure 1:
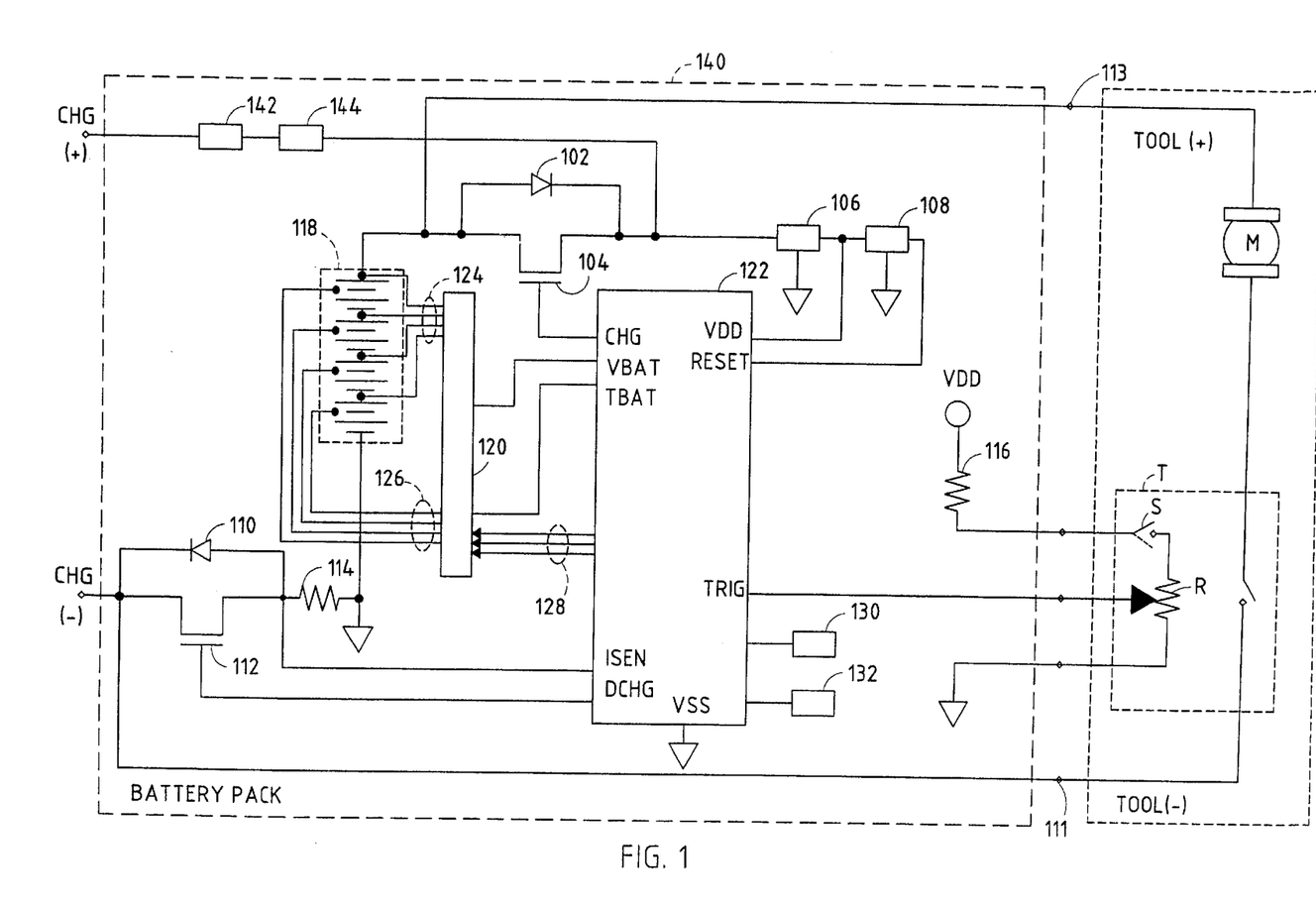
FIG. 1 is an electrical circuit diagram of a battery pack, according to an embodiment of the present invention, providing pulse width modulated power to a tool.

FIG. 1 depicts a battery pack 140 providing power to a tool according to an embodiment of the present invention. If desired, a polyswitch 142 and/or a thermofuse 144 can be added in the charge path. The tool includes a DC motor M and a trigger assembly T. When a trigger of the tool is engaged, power is supplied by battery pack 140 to motor M. Unlike prior battery packs, the power delivered from the battery pack is dependent upon the extent to which the trigger is depressed. Trigger assembly T includes a trigger rheostat R and a microswitch S. One side of trigger rheostat R is coupled to a pull-up resistor 116 to VDD (the regulated processor 122 power supply. The other side of the trigger rheostat R is coupled to a common ground of battery pack 140. A wiper of the trigger rheostat R is coupled to a trigger input (TRIG) of processor 122 (located within battery pack 140) and is moved through physical manipulation of the tool's trigger by the user.

The trigger input (TRIG) of processor 122 is provided to an analog-to-digital (A/D) converter (internal to processor 122). In this configuration, processor 122 is programmed to determine the input voltage on the trigger input (TRIG). In this manner, processor 122 ascertains the degree of retraction of the tool's trigger and outputs a pulse width modulated (PWM) control signal with a corresponding pulse width. The pulse width of the PWM output signal is adjusted by processor 122 when the degree of retraction of the tool's trigger is changed. Processor 122 transmits the PWM control signal from a discharge output (DCHG) terminal which is coupled to a gate of a field effect transistor (FET) 112. FET 112 is turned on and off in response to the PWM control signal. FET 112 is coupled between a low-side of multi-cell battery 118 (in battery pack 140) and output terminal 111 of battery pack 140 so as to modulate the power delivered from battery 118 to the tool. The circuit path is completed by coupling a high-side of multi-cell battery 118 to the tool through output terminal 113. By turning FET 112 on and off, processor 122 varies the power supplied from battery pack 140 to the tool.

Processor 122 is also capable of sensing the current drawn from battery 118. This is accomplished by reading the voltage drop across a resistor 114, which is coupled in series with battery 118. In over-current situations, processor 122 causes FET 112 to turn off by deasserting the gate of FET 112. Turning off FET 112 causes current flow to the tool to be interrupted. Additionally, processor 122 can periodically read the total output voltage of battery 118 and adjust a pulse width of the PWM control signal accordingly. In this fashion, processor 122 can adjust for a declining supply voltage.

Processor 122 derives its operating power from battery 118. A VDD voltage is supplied to processor 122 by a regulator 106. A voltage detector 108 provides a power good signal (reset signal) to processor 122. Regulator 106 and detector 108 are selectively coupled to an output terminal of battery 118 via a FET 104 and a diode 102, which are coupled in parallel to one another. When FET 104 is off, power is still supplied by battery 118 to regulator 106 and detector 108 through diode 102.

The control circuit of the battery pack has two modes of operation (a suspend mode and an active mode). When the control circuit is in the suspend mode, battery energy is conserved to minimize battery drain. The suspend mode is entered when the control circuit senses that neither a tool or battery charger are currently active. During the suspend mode, various battery parameters are monitored allowing the control circuit to compensate for battery self-discharge losses. The control circuit remains in the suspend mode until it senses tool or charger activity. Upon sensing tool or charger activity, the control circuit enters the active mode. The control circuit of the battery pack determines when a tool or charger is present by monitoring the battery current for charge and discharge activity (utilizing resistor 114).

Implementing charge control allows for safer more optimal charging. To provide additional protection, charging is inhibited unless the battery temperatures and voltages are within predetermined limits. Temperature, voltage and current are periodically monitored (by the processor) thus charging can be terminated when these parameters are out of limits. For example, in a 24 volt battery pack, a typical battery 118 would include four battery "stacks," which are each made up of two battery "sticks" connected in parallel. A typical battery stick would consist of five D cell nickel metal hydride cells connected in series each with a voltage of about 1.2 volts. In this embodiment, the control circuit monitors each battery stack such that if the battery stack voltage is less than about 4 volts discharge is terminated. Further, the control circuit monitors each battery stack such that if the battery stack voltage is greater than about 9 volts charging is terminated. In addition, the control circuit of the present invention monitors the temperature of each battery stick such that if the temperature of the battery stick goes below about 0° C. or above about 40° C., charging is discontinued. Additionally, discharge is terminated at about 60° C.

In one embodiment, a routine is programmed into processor 122 which allows it to measure charge and discharge currents and estimate self-discharge. Charge currents are temperature and state-of-charge (SOC) compensated. A charge register maintains the available capacity of the battery pack at a given time. Charging the battery increments the charge register. Battery discharge and self-discharge decrement the charge register and increment a discharge register.

When processor 122 is reset, the charge register is set to zero and a learned battery capacity (LBC) is set to 90% of design capacity. When battery pack 140 is being charged and the charge register equals the LBC, the charge register stops incrementing and the discharge register is reset to zero. Upon reaching an end-of-discharge (EOD) voltage, the charge register is reset to zero. When a charger is providing a maintenance charge, the routine does not over-count because the charge register is maintained at a value less than or equal to the LBC. The battery capacity is also derated as a function of temperature. This is required because of the loss of battery capacity (higher internal battery resistance) at low temperatures. Discharge compensation is not typically needed, as the discharge current is normally repeatable from cycle to cycle.

A calibration cycle is required for new batteries so that the battery capacity can be learned. Calibration cycles are also useful to account for capacity variations due to cycling. At the beginning of a calibration cycle, the battery (plurality of electrochemical cells) is fully charged so that full battery capacity is assured.

An over-voltage causes the charge switch (FET 104) to be turned off if battery 118 is being charged and any one of the battery stack voltages exceeds about 9.0 volts. Under-voltage protection turns off a discharge switch (FET 112) if the battery is being discharged and any one of the battery stack voltages drops below about 4 volts. Low temperature protection turns off the charge switch (FET 104) if the battery temperature is below about 0° C. High temperature protection turns off the charge switch (FET 104) if the battery temperature is above about 40° C. The discharge switch is turned off if the battery exceeds about 60° C. Over-current protection can also be provided by placing fuses and/or breakers in the charge and/or discharge paths.

Processor 122 can control the charging of battery 118 by a battery charger (not shown). When charging of battery 118 is desired, processor 122 asserts the gate of FET 104. When the battery charger is connected to charger inputs (CHG+ and CHG−) with the proper polarity, battery 118 receives a charging current. During charging of battery 118, processor 122 monitors the temperature of the sticks of electrochemical cells and the voltage (battery stack voltage) across the various stacks of electrochemical cells in battery 118. The voltage of battery 118 is monitored across voltage signal lines 124. The temperature of battery 118 is monitored over temperature signal lines 126. As previously mentioned, the charging current can be controlled to provide a near ideal charging current by gating FET 104 off and on at desired intervals. Thus, a less expensive charger can be utilized to charge battery 118.

Battery 118 includes various electrochemical cells. In one embodiment of the present invention, battery 118 includes eight battery sticks. In this embodiment, each of the battery sticks includes five 1.2 volt D cell nickel metal hydride cells connected in series. One of skill in the art will appreciate that any type (e.g., lithium) or size of cell (e.g., AAA–D) could be implemented within the battery pack 140. In the disclosed embodiment, two of the battery sticks connected in parallel form a battery stack. Each of the four battery stacks are connected in a serial manner to provide 24 volts. One of skill in that art will appreciate that other output voltages can be readily implemented. In the 24 volt embodiment, each of the battery stacks includes a temperature probe and a voltage sense line which allow processor 122 to monitor the temperature of each stick and the voltage across each stack.

Voltage signal lines 124 and temperature signal lines 126 are coupled from battery 118 to a multiplexer 120. Control lines 128 from processor 122 are coupled to multiplexer 120. The signals on control lines 128 dictate which voltage signal lines 124 and temperature signal lines 126 are selected. This enables processor 122 to selectively read the stack voltages and stick temperatures of battery 118. In this manner, processor 122 can determine whether one of the battery stacks in battery 118 is being overcharged.

When processor 122 determines that battery 118 is being overcharged it deasserts the gate of FET 104. This interrupts the charging current from the charger. In the preferred embodiment, processor 122 is a microcontroller (part no. PIC 14000) manufactured by Microchip Technology Inc. In this context, the term processor may include a general purpose processor, a microcontroller (i.e., an execution unit with memory, etc., integrated within a single integrated circuit), a digital signal processor, or a programmable logic array.

As described below, a fuel gauging/diagnostic switch 132 enables a user to determine the current state-of-charge (SOC) of battery 118. Switch 132 is coupled to an input of processor 122. Processor 122 is programmed to periodically check whether switch 132 is active. When switch 132 is active, processor 122 causes a display 130 to display a corresponding SOC. In the disclosed embodiment, display 130 consists of four LEDs whose illumination visually indicates a SOC of battery 118 to a user.

Battery pack 140, according to an embodiment of the present invention, provides fuel gauging and allows for safer operation throughout the service life of battery pack 140. A SOC of battery pack 140 is determined by integrating (under processor control) the input and output currents associated with the electrochemical cells of battery pack 140. To achieve a desired fuel gauging accuracy, various compensation factors are needed to account for battery nonlinearity and environmental conditions. Fuel gauging provides a user with a measurement of battery capacity that lowers the possibility that battery pack 140 run time is overstated. In an embodiment, the SOC is visually provided by four light emitting diodes (LEDs) (under processor control) when a user actuates switch 132.

Activating switch 132 causes the appropriate SOC LEDs to provide fuel gauge status for about 5 seconds. During charge or discharge, the fuel gauge status is automatically displayed. If all four LEDs are lit, battery pack 140 has a capacity between about 76–100%. If three of the four LEDs are lit, battery pack 140 has a capacity between about 51–75%. If two LEDs are lit, battery pack 140 has a capacity between about 26–50%. If only one LED is lit, battery pack 140 has a capacity between about 11–25%. When a single LED is blinking, the capacity of battery pack 140 is less than or equal to about 10%. One skilled in the art will appreciate that above-assigned ranges and the number of LEDs is a design choice that can readily be modified.

In this embodiment, various diagnostic information can be obtained when switch 132 is held for more than 5 seconds. For example, when a first LED is lit, the charger is disabled (i.e., the charge switch is turned off). When the first LED is blinking, the rate-of-charge is low. When the first LED is off, a high rate-of-charge is indicated. If a second LED is continuously on, either a voltage or temperature is too high. If the second LED is blinking, either a voltage or a temperature is too low. If the second LED is off, the voltages and the temperatures are within acceptable limits.

A third LED indicates various discharge parameters. When the third LED is on, the temperature is too high. When the third LED is blinking, a substantially discharged battery pack 140 is indicated. When the third LED is off, both the temperature and capacity are within acceptable limits. A fourth LED indicates the discharge status. If the fourth LED is on, discharge is disabled. On the other hand, if the fourth LED is off, discharge is enabled.

Thus, diagnostic information is displayed when the user presses switch 132 and holds it in the depressed state. Diagnostic information is displayed until switch 132 is released. One of skill in the art will appreciate that other information could be displayed in a similar manner. As previously mentioned, the state of switch 132 is monitored by processor 122 of the control circuit. Alternatively, analog circuitry (such as comparators, etc.) can be used to monitor the state of various signal lines. As mentioned above, processor 122 implements an appropriate routine based on the condition of switch 132 and battery pack 140. Processor 122 of the present invention can, if desired, communicate with outside hosts across a system management bus (SMB bus).

Figure 2A:
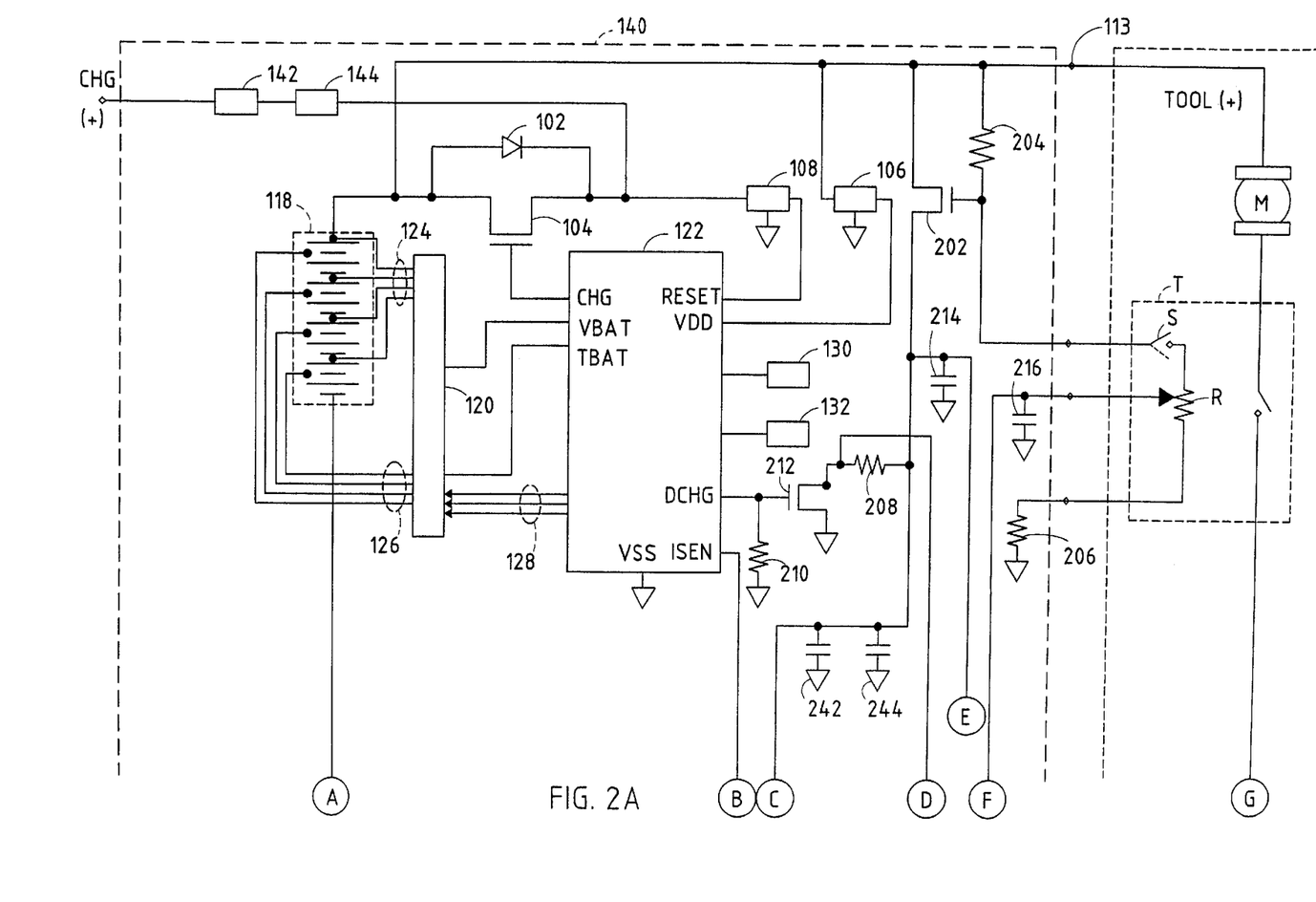
FIGS. 2A–B are an electrical circuit diagram of another battery pack, according to an embodiment of the present invention, providing pulse width modulated power to a tool.
Figure 2B:
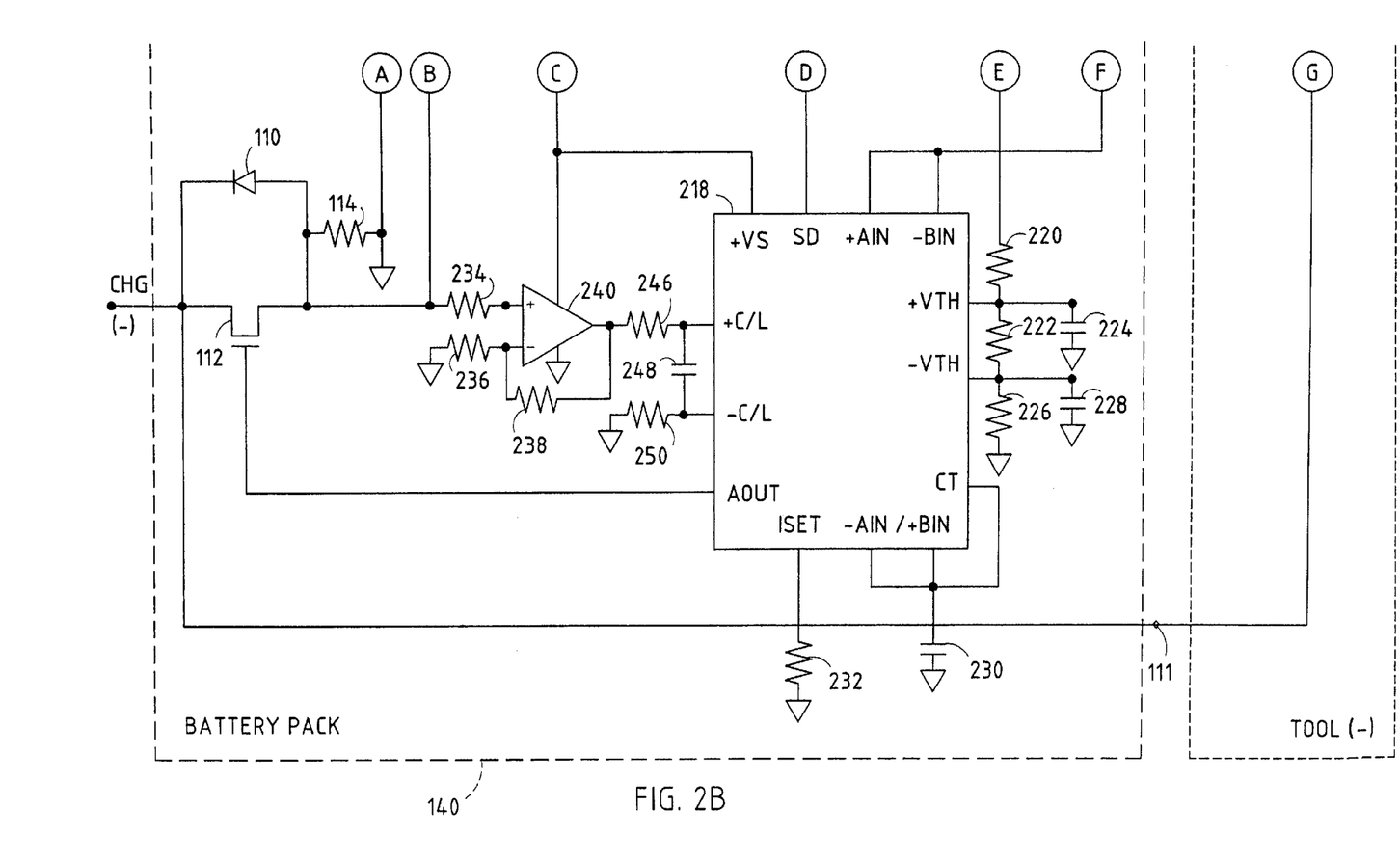

FIGS. 2A–B illustrate another embodiment of battery pack 140 in which elements in common with the embodiment of FIG. 1 are identified by the same reference numeral. A main difference between the embodiment shown in FIGS. 2A–B and that of FIG. 1 includes the addition of a PWM circuit 218. The addition of PWM circuit 218 allows a designer to use a lower cost processor and still provide a relatively wide range of frequencies at which a signal can be modulated. Processor 122 receives VDD power from regulator 106. Processor 122 receives the power good signal (reset signal) from detector 108. As before, processor 122 monitors battery voltage and temperature. As with the embodiment shown in FIG. 1, this is accomplished by selecting the desired signal line 124 and 126 utilizing multiplexer 120. As previously discussed in conjunction with FIG. 1, control lines 128 determine which input of multiplexer 120 is supplied to processor 122. As in FIG. 1, signal lines 126 couple a plurality of temperature probes to multiplexer 120. Also, voltage signal lines 124 are coupled to inputs of multiplexer 120. In this manner, processor 122 can determine the voltage and temperature of the various battery stacks of battery 118.

Similar to FIG. 1, processor 122 of FIG. 2A can read the voltage (ISEN) across resistor 114. In this embodiment, resistor 114 is also coupled to resistor 234. Resistor 234 is coupled to a positive terminal of operational amplifier 240. A resistor 236 is coupled between ground and a negative terminal of operational amplifier 240. Another resistor 238 is coupled between the negative terminal of operational amplifier 240 and an output terminal of operational amplifier 240. A resistor 246 is coupled between the output of operational amplifier 240 and an input (+C/L) of pulse width modulation (PWM) circuit 218. A capacitor 248 is coupled between the +C/L input and a –C/L input of PWM circuit 218. A resistor 250 is coupled between the –C/L input of PWM circuit 218 and ground. In the preferred embodiment, PWM circuit 218 is a UC 1637 manufactured by the Unitrode Corp. of Merrimac, N.H. As stated above, implementing PWM circuit 218 allows a lower cost processor to be utilized. This is because PWM circuit 218 can be chosen to provide a wider range of frequencies than many lower cost processors.

The value of resistors 236 (R236) and 238 (R238) set the gain of operational amplifier 240. The output of operational amplifier 240 provides a current limiting voltage to PWM circuit 218. This allows PWM circuit 218 to be shut-down when a current through resistor 114 reaches a desired level. In the disclosed embodiment, operational amplifier 240 is set for a gain of 2 (1+R238/R236, where R236 is equal to R238). Internal to PWM circuit 218 is an operational amplifier which is coupled to the +C/L and –C/L inputs. If the voltage on the +C/L input exceeds about 200 mV, the output of the internal operational amplifier goes to a positive supply rail (+VS).

An output of the internal operational amplifier is internally coupled to a reset line of an internal flip-flop (within PWM circuit 218). An output of the internal flip-flop is coupled to an internal AND gate. An output of the AND gate is coupled to an internal buffer which in turn is provided as an output (AOUT). Thus, when the voltage on the +C/L input exceeds approximately 200 mV the output of the internal flip-flop is reset. This causes the output (AOUT) of PWM circuit 218 to go to the negative rail (–VS, in this case ground). The AOUT output of PWM circuit 218 is coupled to the gate of FET 112.

PWM circuit 218 also includes an internal oscillator. The internal oscillator is used to set the operating frequency of PWM circuit 218. The operating frequency of the internal oscillator is adjusted with external components. These components include a resistor 220, a resistor 222, a resistor 226, a resistor 232 and a capacitor 230. A current (ISET) is set by resistor 232. In this embodiment, ISET is equal to the positive threshold voltage (+VTH) divided by the value of resistor 232 (R232). The operating frequency (F) of the internal oscillator is equal to ISET divided by 2 times the value of capacitor 230 (C230), times the positive threshold voltage (+VTH) minus the negative threshold voltage (–VTH).

The positive threshold voltage (+VTH) is equal to the battery voltage (VBAT) times the value of resistor 222 (R222) plus the value of resistor 226 (R226) divided by the value of resistor 222 (R222) plus the value of resistor 226 (R226) plus the value of resistor 220 (R220). The negative threshold voltage (–VTH) is equal to the battery voltage (VBAT) times the value of resistor 226 (R226) divided by the value of resistor 222 (R222) plus the value of resistor 226 (R226) plus the value of resistor 220 (R220). The equations as previously stated are as follows:

$$F = \frac{ISET}{2*(C230)[(+VTH)-(-VTH)]}$$

$$ISET = \frac{+VTH}{R232}$$

$$+VTH = VBAT\left(\frac{(R222+R226)}{R222+R226+R220)}\right)$$

$$-VTH = VBAT\left(\frac{R226}{R222+R226+R220}\right)$$

PWM circuit 218 includes a shut-down terminal (SD) that can be used for implementing various shut-down protection schemes. Pulling the shut-down terminal (SD) more than 2.5 V below +VS disables output AOUT. This is accomplished when processor 122 asserts an output on (DCHG). When DCHG is asserted a FET 212 turns on. When FET 212 is turned on, the input on the SD line of PWM circuit 218 is more than 2.5 V below +VS. This causes the AOUT output of PWM circuit 218 to be disabled (FET 112 shuts off).

As in FIG. 1, a tool is depicted which includes a DC motor M and a trigger assembly T. Trigger assembly T includes a trigger rheostat R. One side of trigger rheostat R is coupled to a resistor 206 of battery pack 140. The opposite side of resistor 206 is coupled to a common ground on battery pack 140. The other side of trigger rheostat R is coupled to a gate of a FET 202 (through a microswitch S) and one side of a resistor 204. The other side of resistor 204 is coupled to the VBAT line of battery pack 140.

The gate of FET 202 is asserted when a tool is connected. This allows FET 202 to provide power to operational amplifier 240 and PWM circuit 218. If a tool is not coupled to battery pack 140 then the gate of FET 202 is pulled to VBAT. Pulling the gate of FET 202 to VBAT causes FET 202 to shut off. Thus, power is conserved in that operational amplifier 240 and PWM circuit 218 do not receive power when a tool is not connected.

Figure 3A:
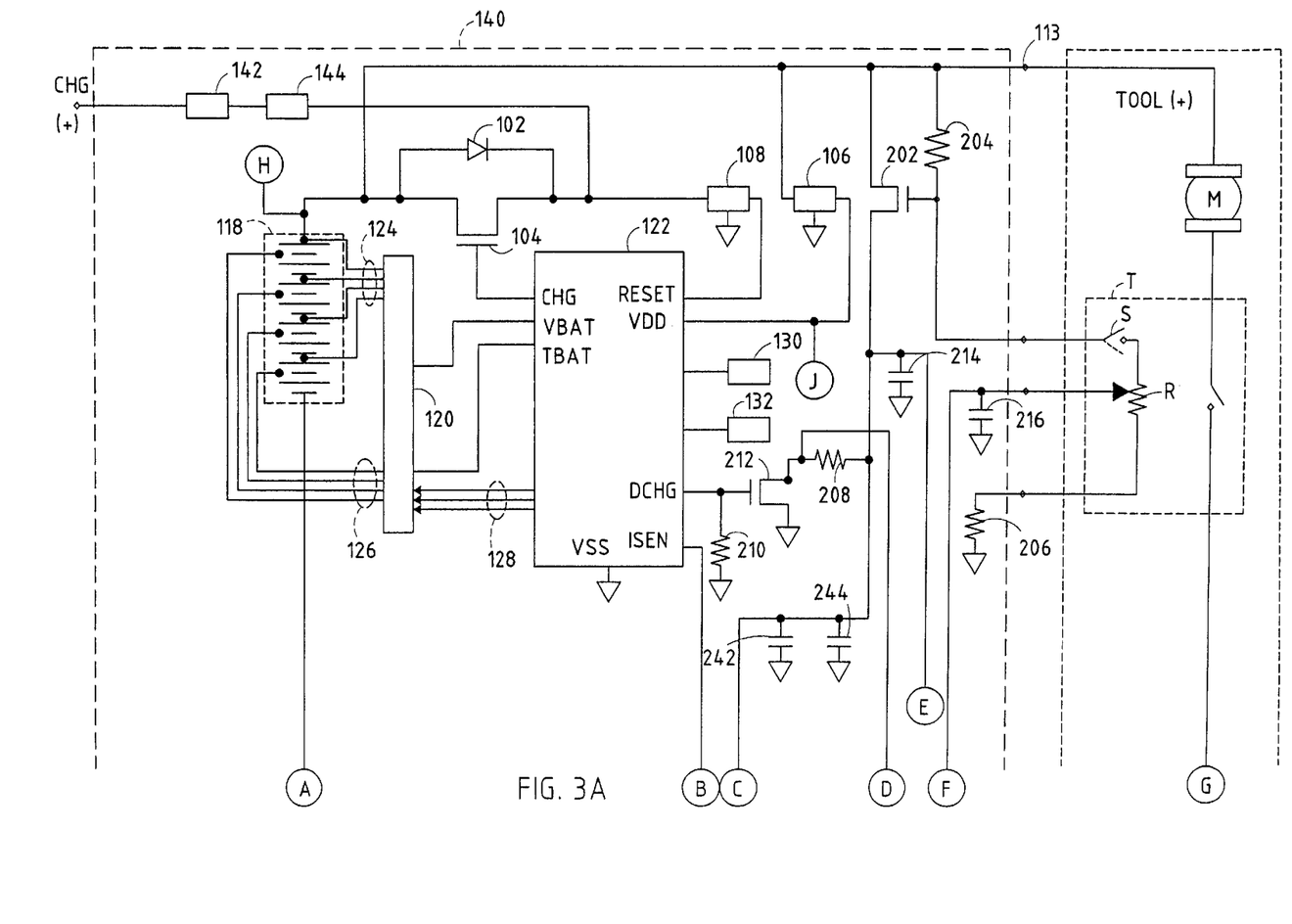
FIGS. 3A–C are an electrical circuit diagram of yet another battery pack, according to an embodiment of the present invention, providing pulse width modulated power to a tool.
Figure 3B:
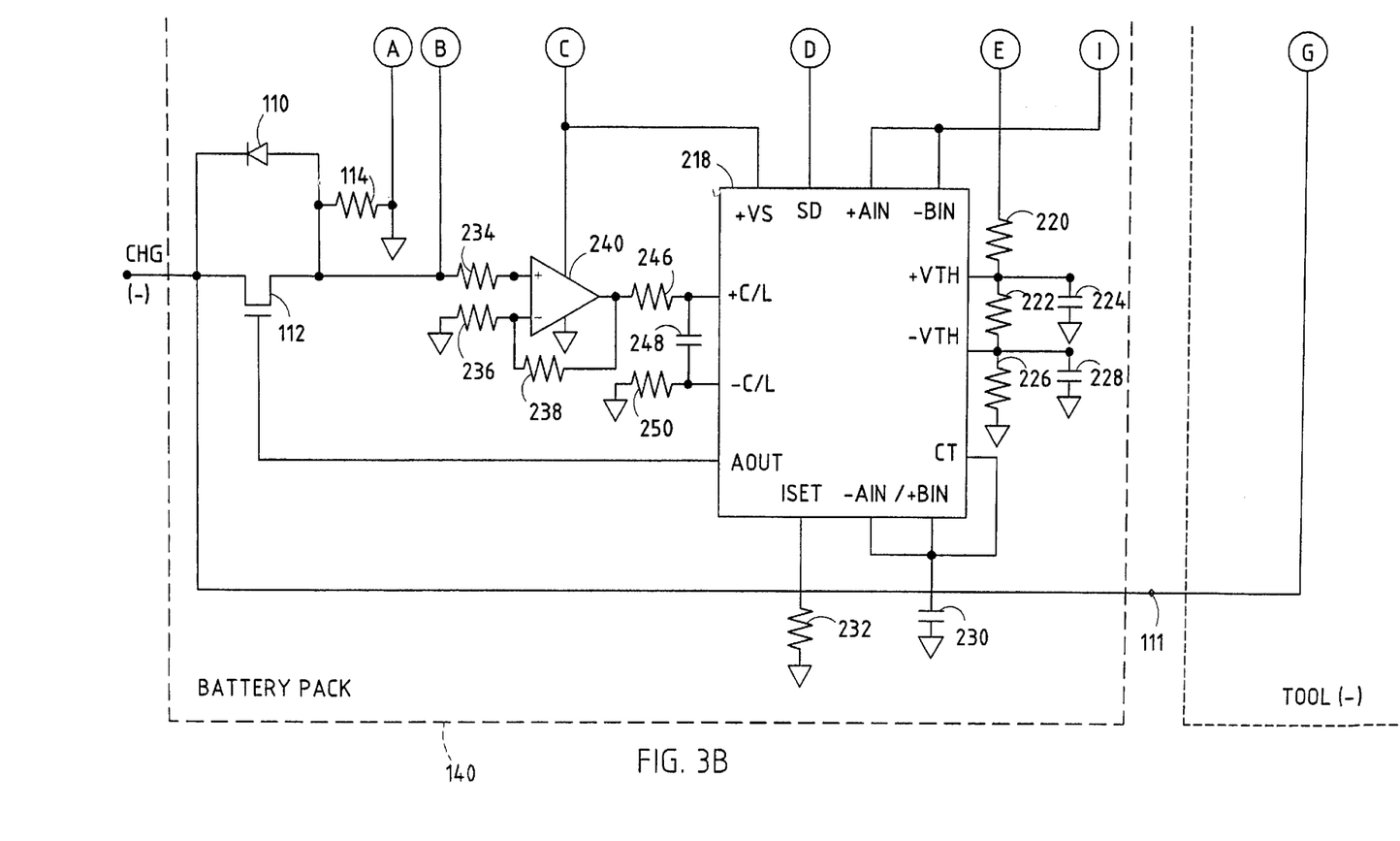
Figure 3C:
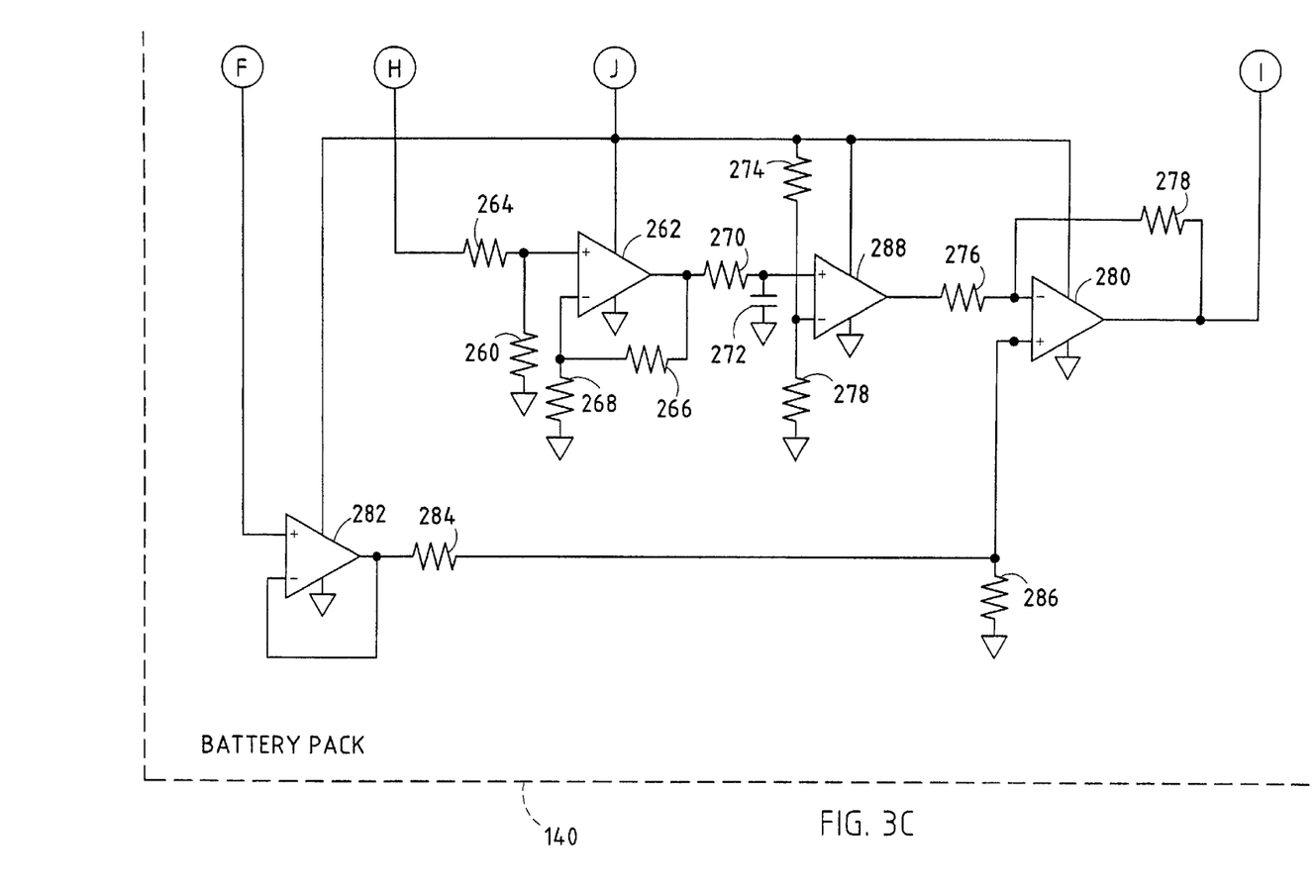

FIGS. 3A–C illustrate yet another embodiment of battery pack 140 in which elements in common with the embodiment of FIGS. 2A–B are identified by the same reference numeral. A main difference between the embodiment shown in FIGS. 3A–C and that shown in FIGS. 2A–B is the addition of circuitry (see FIG. 3C) to automatically compensate for a declining supply voltage (VBAT). The circuitry of FIG. 3C adjusts its output (I) based on both a declining supply voltage (VBAT) and a trigger input signal (TRIG) from a tool (F). The circuitry of FIGS. 3A–C also differs from that of FIGS. 2A–B in that a wiper signal (TRIG) from the tool is coupled to the circuitry shown in FIG. 3C and not directly to PWM circuit 218.

More specifically, the trigger input signal is coupled into a positive terminal of an operational amplifier 282. Operational amplifier 282 is set for unity gain (i.e., a negative terminal of operational amplifier 282 is shorted to an output terminal of operational amplifier 282). The output terminal of operational amplifier 282 is coupled through a resistive divider (that includes a resistor 284 (with a value of R284) and a resistor 286 (with a value of R286)) to a positive input terminal of an operational amplifier 280.

The battery voltage (VBAT) is coupled to an operational amplifier 262 through a resistive divider (that includes a resistor 264 and a resistor 260). The gain of operational amplifier 262 is set by a resistor 268 (with a value of R268) and a resistor 266 (with a value of R266). The gain of operational amplifier 262 is equal to R266 plus R268 divided by R268 (1+R266/R268). A resistor 270 serves to limit current and in conjunction with a capacitor 272, sets the rise time of an input voltage on a positive terminal of an operational amplifier 288. A resistor 274 is coupled to VDD and is also coupled to a negative terminal of operational amplifier 288. A resistor 278 is coupled between the negative terminal of operational amplifier 288 and ground.

Thus, resistor 278 (with a value of R278) and resistor 274 (with a value of R274) divide VDD and set a trip-point (VDD(R278/(R274+R278))), at the negative terminal of operational amplifier 288. When the input signal on the positive terminal of operational amplifier 288 is greater than that on the negative terminal of operational amplifier 288, the output of operational amplifier 288 goes to VDD. When the input signal on the negative terminal of operational amplifier 288 is greater than that on the positive terminal of operational amplifier 288, the output of operational amplifier 288 goes to ground. Thus, the output of operational amplifier 288 will either be equal to VDD or ground, depending upon the input signals applied to the positive and negative terminals of operational amplifier 288.

The output voltage on an output terminal of operational amplifier 280 is determined by a resistor 276 (with a value of R276) and a resistor 278 (with a value of R278), an input voltage on the positive terminal of operational amplifier 280 and the output voltage on the output terminal of operational amplifier 288. The output voltage of operational amplifier 280 is equal to the input voltage on the positive terminal of operational amplifier 280 (V280+, where V280+=VTRIG (R286/(R284+R286))) times one plus R278 divided by R276 minus VDD times R278 divided by R276 ((VTRIG(R286/(R284+R286))(1+R278/R276))−VDD(R278/R276)).

Thus, the output of operational amplifier 280 is decreased by VDD times R278 divided by R276 (VDD(R278/R276)), provided VBAT(R260/(R260+R264))*(1+R266/R268) is above the trip-point (VDD(R278/(R274+R278))). The output terminal of operational amplifier 280 is coupled to a +AIN/−BIN terminal of PWM circuit 218. In this manner, when VBAT drops below a certain level, the output of operational amplifier 280 increases which causes PWM circuit 218 to increase the pulse width from output terminal AOUT to compensate for the decrease in VBAT. To summarize, when VBAT declines below the set trip-point the output voltage on the output terminal of operational amplifier 280 increases. This increase causes PWM circuit 218 to increase the time that FET 112 is turned on, which in turn increases the pulse width of the pulse width modulated waveform that provides power to an attached tool.

Figure 4:
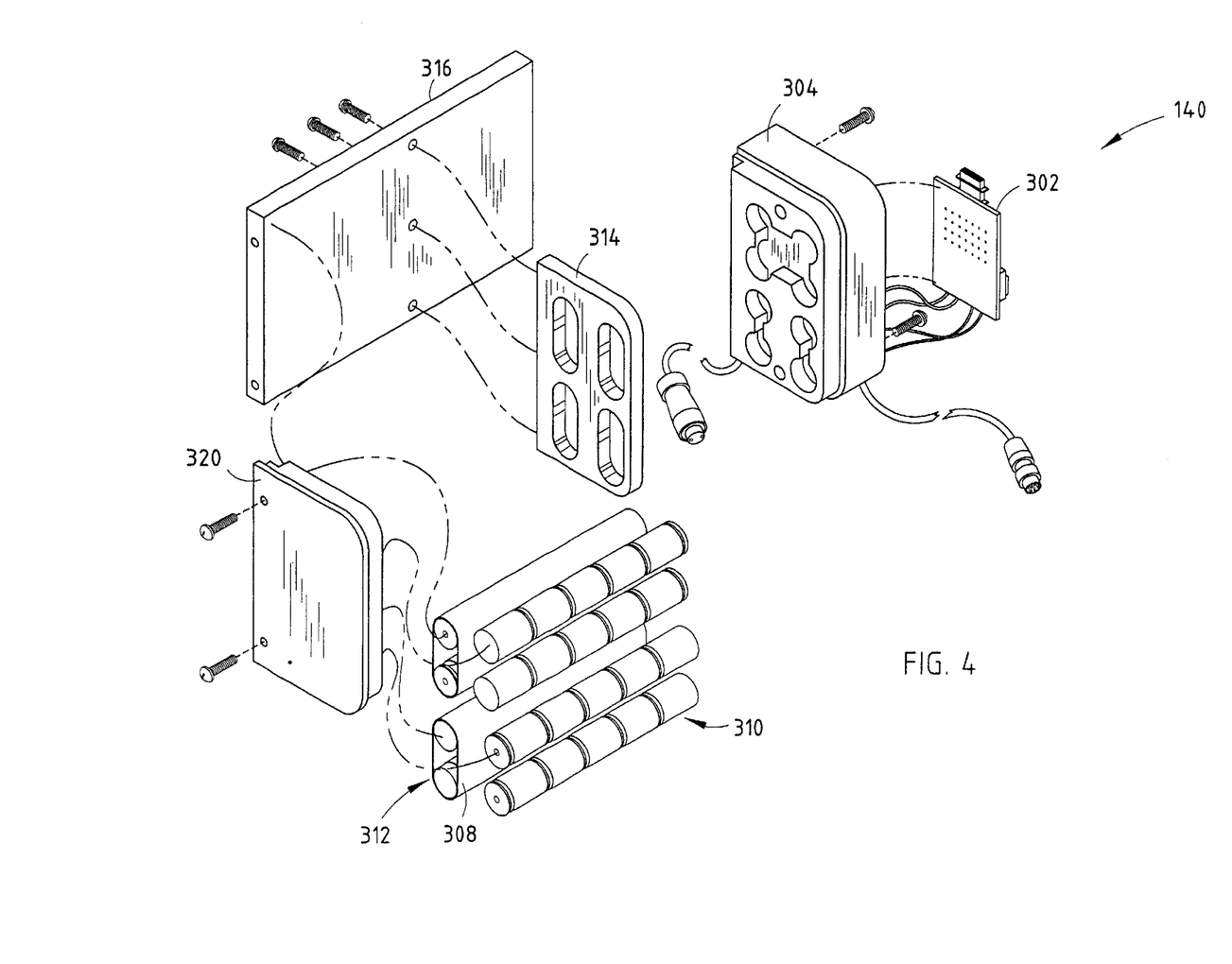
FIG. 4 is an exploded view of a battery pack, according to an embodiment of the present invention.

FIG. 4 depicts an exploded view of a battery pack 140 according to one embodiment of the present invention. In the preferred embodiment, battery stick 310 includes multiple D size nickel metal hydride cells. In this embodiment, two battery sticks 310 form a battery stack 312. Electrochemical cells within a stick are connected serially. Connecting two battery sticks 310 in parallel to form a battery stack 312 allows the battery pack 140 to source more current. The battery sticks 310 and/or battery stacks 312 are supported by a center support 314. The battery stack 312 is retained by end plates 304 and 320. The end plates 304 and 320 may include contacts within them. The battery sticks/stacks 310 and 312 are removable and can be replaced. Locating the contacts within end plates 304 and 320 eases the removal and replacement of the battery sticks/stacks 310 and 312.

A cover (not shown) is provided to prevent a user from coming in contact with internal components (i.e., battery stacks 312) and may be vented to improve heat dissipation. End plates 304 and 320 and center support 314 are coupled to a back plate 316. As previously stated, multiple battery sticks 310 are coupled together to form a battery stack 312. Each battery stack 312 can be wrapped in shrink-wrap 308. If desired, a moisture resistant barrier (such as, glyptal) can be applied to each battery stick. An end cover (not shown) is coupled to end plate 304. The end cover provides access to a printed circuit board (PCB) 302 located within a receptacle formed in end plate 304. PCB 302 includes battery pack 140 electronics, e.g., processor 122, regulator 106 and detector 108, multiplexer 120, etc.

Connectors (not shown) can be fixed into end plate 304. In this configuration, the fixed connectors mate to releasable connectors of a flexible cable and attach battery pack 140 to a tool. Thus, the connectors provide for electrical connection between a tool and PCB 302 (located within the receptacle of end plate 304). Alternatively, battery pack 140 can be coupled to a tool through flexible cables that are fixed into end plate 304. In this implementation, the flexible cables include releasable connectors on the tool end of the cables.

A window opening (not shown) in the end cover provides limited visual access to a user. The visual access allows a user to see a display 130 (see FIG. 1) located on the PCB 302. An external pin (not shown) mounted in the end cover allows a user to activate switch 132 (see FIG. 1) located on PCB 302. Switch 132 is connected internally to processor 122 which is located on PCB 302. When a user pushes the external pin and activates switch 132, processor 122 senses this and causes display 130 to display the SOC or diagnostic information for battery pack 140, as previously described.

Flexible tool connectors allow a user to easily detach various tools from battery pack 140. This is advantageous in that numerous tools can be used with battery pack 140. In the preferred embodiment, end plates 304 and 320, the end cover, back plate 316, center support 314 and cover (not shown) are made of a lightweight plastic. The lightweight plastic reduces weight thus enabling a user to more easily carry battery pack 140 on a backpack.

Figure 5A:
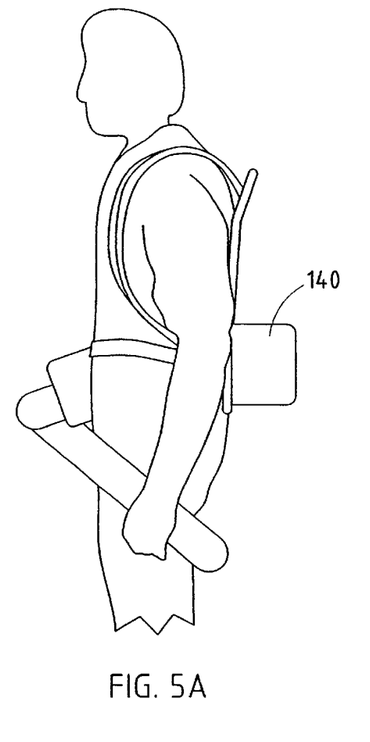
FIG. 5A is a side view of the battery pack of FIG. 4 mounted in a backpack, according to an embodiment of the present invention.
Figure 5B:
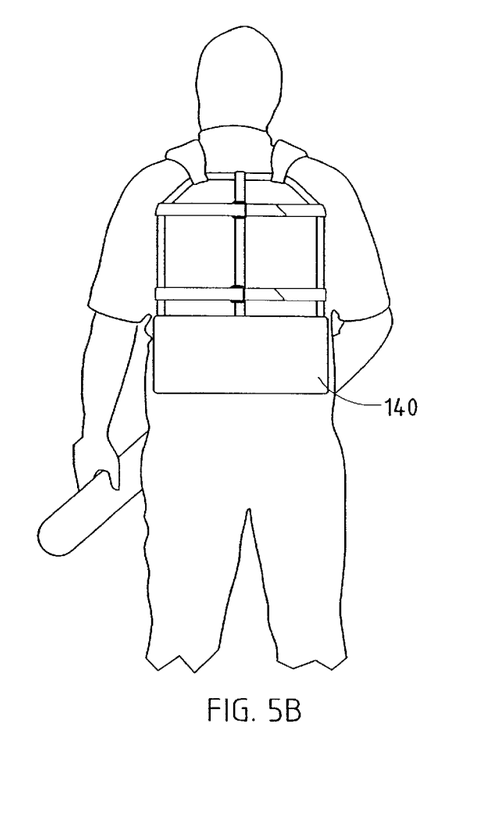
FIG. 5B is a rear view of the battery pack of FIG. 4 mounted in a backpack, according to an embodiment of the present invention.

FIG. 5B is rear view of battery pack 140 of FIG. 4 mounted in a backpack. FIG. 5A is a side view of battery pack 140 of FIG. 4 mounted in a backpack. The backpack of FIGS. 5A–B advantageously allow a user to carry battery pack 140 and at the same time perform various chores with a given tool. For example, the tool could be a leaf blower, a pruner, a weed whacker, a blower, an electric chain saw, an edger, a trimmer or any number of electric powered tools.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. A battery pack for providing power to a tool in the form of a pulse width modulated waveform, comprising:
 a plurality of electrochemical cells providing a total output voltage wherein a number of the electrochemical cells are connected in a serial manner to form a plurality of battery sticks, and wherein a number of the battery sticks are connected in parallel to form a plurality of battery stacks, and wherein a number of the battery stacks are connected in a serial manner to provide the total output voltage; and
 a control circuit coupled to the plurality of electrochemical cells, the control circuit receiving a trigger signal from the tool, wherein the control circuit is adapted to change a pulse width of the pulse width modulated waveform in response to variations in the trigger signal, and wherein the control circuit also receives an indication of the total output voltage and is also adapted to change the pulse width of the pulse width modulated waveform in response to variations in the total output voltage, and wherein the control circuit is capable of providing a voltage indicator for either at least one battery stick or at least one battery stack.

2. The battery pack of claim 1, wherein the control circuit disconnects a battery charger from the battery pack if the voltage indicator exceeds a first predetermined voltage.

3. The battery pack of claim 2, wherein said first predetermined voltage is about 9.0 volts.

4. The battery pack of claim 3, wherein the control circuit disconnects a tool from the battery pack if the voltage level of one of the battery stacks goes below a second predetermined voltage.

5. The battery pack of claim 4, wherein said second predetermined voltage is about 4.0 volts.

6. A battery pack for providing power to a tool in the form of a pulse width modulated waveform, comprising:
 a plurality of electrochemical cells providing a total output voltage; and
 a control circuit coupled to the plurality of electrochemical cells, the control circuit receiving a trigger signal from the tool, wherein the control circuit is adapted to change a pulse width of the pulse width modulated waveform in response to variations in the trigger signal, and wherein the control circuit also receives an indication of the total output voltage and is also adapted to change the pulse width of the pulse width modulated waveform in response to variations in the total output voltage, and wherein the control circuit is capable of determining the magnitude of a charging current provided by a battery charger and is also adapted to modify the charging current to provide a substantially optimal charging current for the plurality of electrochemical cells; and wherein the pulse width modulated waveform has a predetermined frequency in a range of about 800 Hz to 1 kHz.

7. A battery pack for providing power to a tool in the form of a pulse width modulated waveform, comprising:
 a plurality of electrochemical cells providing a total output voltage, wherein a number of the electrochemical cells are connected in a serial manner to form a plurality of battery sticks, and wherein a number of the battery sticks are connected in parallel to form a plurality of battery stacks, and wherein a number of the battery stacks are connected in a serial manner to provide the total output voltage; and
 a control circuit coupled to the plurality of electrochemical cells, the control circuit receiving a trigger signal from the tool, wherein the control circuit is adapted to change a pulse width of the pulse width modulated waveform in response to variations in the trigger signal, and wherein the control circuit also receives an indication of the total output voltage and is also adapted to change the pulse width of the pulse width modulated waveform in response to variations in the total output voltage; and
 at least one temperature sensor coupled to the control circuit providing a temperature indication for either at least one individual cell or at least one stick of cells, wherein the control circuit prevents a battery charger from charging the battery pack if the temperature indication falls below a first predetermined temperature.

8. The battery pack of claim 7, wherein said first predetermined temperature is about 0 degrees Celsius.

9. The battery pack of claim 8, wherein the control circuit prevents a battery charger from charging the battery pack if the temperature indication rises above a second predetermined temperature.

10. The battery pack of claim 9, wherein said second predetermined temperature is about 40 degrees Celsius.

11. The battery pack of claim 10 wherein the control circuit prevents the battery pack from providing power to the tool if the temperature indication rises above a third predetermined temperature.

12. The battery pack of claim 11 wherein said third predetermined temperature is about 60 degrees Celsius.

13. A battery pack for supplying power to an electrical device, said battery pack comprising:
 a housing;
 a plurality of electrochemical cells disposed within said housing; and
 a control circuit disposed in said housing and operatively coupled to said plurality of electrochemical cells, said control circuit receiving a power demand signal from the electrical device indicating a voltage level to be supplied from the battery pack to the electrical device, said control circuit varying the voltage level output from the battery pack in response to said power demand signal, wherein said control circuit generates a pulse width modulated waveform having an average voltage per unit time that corresponds to the power demand signal from the electrical device, wherein said control circuit monitors the voltage of said cells and controls the charging and discharging of the cells in response to the voltage of the cells, and wherein said control circuit includes a switch coupled between the cells and an output terminal of the battery pack for selectively modulating the supply of power from the cells through the output terminal.

14. The battery pack as defined in claim 13, wherein said switch is controlled to modulate the supply of power in response to the voltage of the cells.

15. The battery pack as defined in claim 13, wherein said switch is controlled to modulate the supply of power in response to the power demand signal.

16. The battery pack as defined in claim 13, wherein said switch is controlled to prevent the cells from being further discharged when the voltage of the cells falls below a threshold value.

17. A battery pack for providing power to a tool in the form of a pulse modulated waveform, comprising:

a plurality of electrochemical cells providing a total output voltage, wherein a number of the electrochemical cells are connected in a serial manner to form a plurality of battery sticks, and wherein a number of the battery sticks are connected in parallel to form a plurality of battery stacks, and wherein a number of battery stack are connected in a serial manner to provide the total output voltage; and a control circuit coupled to the plurality of electrochemical cells, the battery pack receiving a charging current from a battery charger, wherein the control circuit receives an indication of the charging current provided by the battery charger, and wherein the control circuit is adapted to modify the charging current to provide a substantially optimal charging current for the plurality of electrochemical cells, wherein the control circuit also receives a trigger signal from the tool and is adapted to change a pulse width of the pulse width modulated waveform in response to variations in the trigger signal, wherein the control circuit also receives an indication of the total output voltage and is also adapted to change the pulse width of the pulse width modulated waveform in response to variations in the total output voltage, and wherein the control circuit is capable of providing a voltage indicator for either at least one battery stick or at least one battery stack.

18. The battery pack of claim 17, wherein the control circuit disconnects a battery charger from the battery pack if the voltage indicator exceeds a first predetermined voltage.

19. The battery pack of claim 18, wherein said first predetermined voltage is about 9.0 volts.

20. The battery pack of claim 19, wherein the control circuit disconnects a tool from the battery pack if the voltage level of one of the battery sticks goes below a second predetermined voltage.

21. The battery pack of claim 20, wherein said second predetermined voltage is about 4.0 volts.

22. A battery pack for providing power to a tool in the form of a pulse width modulated waveform, comprising:

a plurality of electrochemical cells providing a total output voltage, wherein a number of the electrochemical cells are connected in a serial manner to form a plurality of battery sticks, and wherein a number of the battery sticks are connected in parallel to form a plurality of battery stacks, and wherein a number of battery stack are connected in a serial manner to provide the total output voltage; and a control circuit coupled to the plurality of electrochemical cells, the battery pack receiving a charging current from a battery charger, wherein the control circuit receives an indication of the charging current provided by the battery charger, and wherein the control circuit is adapted to modify the charging current to provide a substantially optimal charging current for the plurality of electrochemical cells, wherein the control circuit also receives a trigger signal from the tool and is adapted to change a pulse width of the pulse width modulated waveform in response to variations in the trigger signal, wherein the control circuit also receives an indication of the total output voltage and is also adapted to change the pulse width of the pulse width modulated waveform in response to variations in the total output voltage; and at least one temperature sensor coupled to the control circuit providing a temperature indication for either at least one cell or at least one battery stick, wherein the control circuit prevents a battery charger from charging the battery pack if the temperature indication falls below a first predetermined temperature.

23. The battery pack of claim 22, wherein said first predetermined temperature is about 0 degrees Celsius.

24. The battery pack of claim 23, wherein the control circuit prevents a battery charger from charging the battery pack if the temperature indication rises above a second predetermined temperature.

25. The battery pack of claim 24, wherein said second predetermined temperature is about 40 degrees Celsius.

26. The battery pack of claim 25, wherein the control circuit prevents the battery pack from providing power to the tool if the temperature indication rises above a third predetermined temperature.

27. The battery pack of claim 26, wherein said third predetermined temperature is about 60 degrees Celsius.

* * * * *